UNITED STATES PATENT OFFICE.

FRIEDRICH SCHOENBECK, OF LEIPZIG, GERMANY.

PROCESS FOR THE PRODUCTION OF TOOTH-CEMENT.

No. 897,160.

Specification of Letters Patent.

Patented Aug. 25, 1908.

Application filed November 8, 1907. Serial No. 401,319.

*To all whom it may concern:*

Be it known that I, FRIEDRICH SCHOENBECK, a subject of the German Emperor, residing at Leipzig, Germany, have invented new and useful Improvements in Processes for the Production of Tooth-Cement, of which the following is a specification.

The present invention relates to a process for the production of a silicate-cement possessing a vitreous structure and transparency and particularly adapted for use as a toothfilling material.

In producing the composition I use—Sodium-aluminium fluorid (kryolith), silicic acid and calcium oxid and to this mixture add up to 5% of beryl as required, in order to retard the setting or hardening of the mixture. These materials are intimately mixed and fused into a glass in an electrical furnace. The cooled mass is pulverized and forms thus without any further admixture a portion of the tooth cement. The powder thus obtained is stirred with an acid consisting of phosphoric acid (meta-ortho-pyro) containing some aluminium hydroxid dissolved (in solution) until a plastic (moldable) mass results. The mass thus produced is placed in the tooth to be treated and solidifies there to a firm, hard, transparent filling of vitreous structure.

I claim:

The process for the production of tooth cement consisting in taking sodium-aluminium fluorid (kryolith), silicic acid and calcium oxid, fusing the same with a beryl admixture up to 5%; cooling and pulverizing and then adding to the resultant powder a phosphoric acid (meta-ortho-pyro) containing a little aluminium hydroxid in suspension, until a plastic mass ensues, substantially as described.

In testimony whereof I have signed my name to this specification in the presence of two subscribing witnesses.

FRIEDRICH SCHOENBECK.

Witnesses:
 HERMANN SCHALCK,
 RUDOLPH FRICKE.